F. A. SHEELEY.
Coupling Air and Steam Brake Pipes on Cars.

No. 204,383. Patented May 28, 1878.

WITNESSES
Franck L. Ourand
J. J. McCarthy

INVENTORS
Frederick A. Sheeley
Alexander Mason
By Attorneys

UNITED STATES PATENT OFFICE.

FREDERICK A. SHEELEY, OF PRAIRIE CITY, ILLINOIS.

IMPROVEMENT IN COUPLING AIR AND STEAM BRAKE PIPES ON CARS.

Specification forming part of Letters Patent No. 204,383, dated May 28, 1878; application filed April 8, 1878.

*To all whom it may concern:*

Be it known that I, FREDERICK A. SHEELEY, of Prairie City, in the county of McDonough and State of Illinois, have invented certain new and useful Improvements in Coupling Air and Steam Brake Pipes on Railroad-Cars; and I do hereby declare that the following is a full, clear, and exact description of my invention, which will enable others skilled in the art to which it appertains to make and use the same, reference being had to the accompanying drawings, and to the letters of reference marked thereon, which form a part of this specification.

The nature of my invention consists in the formation and construction of certain metallic pipes and joint connections for coupling the air-brake pipes on railroad-cars, the peculiarities of which will be hereinafter more particularly described.

To enable those skilled in the art to make and use my invention, I will now proceed to describe its construction and operation.

Figure 1:
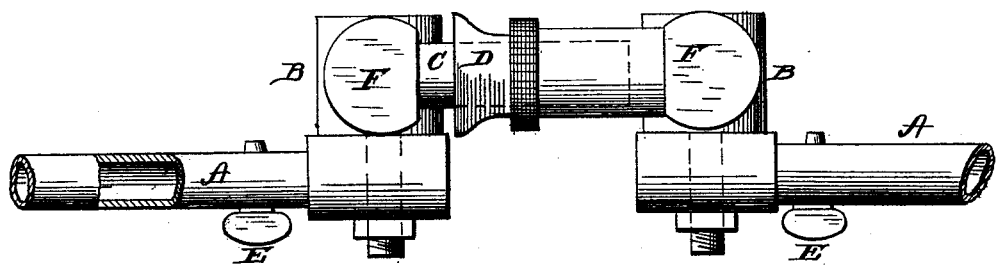
Figure 2:
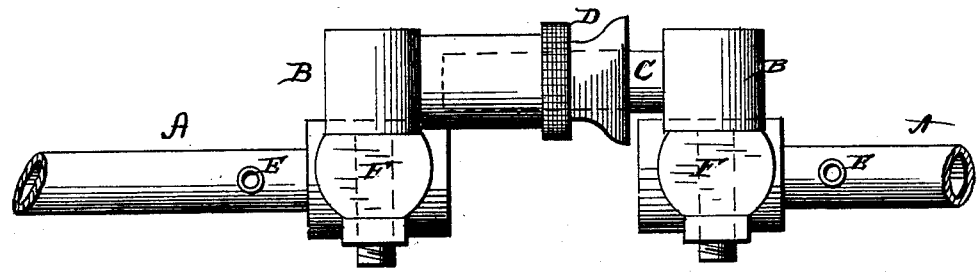

In the accompanying drawings, making part of this specification, Figures 1 and 2 are plan views in different positions.

A A represent the long air-pipes for conveying the air from one end of a train of cars to the other, one pipe being used to each car, which pipes are suitably coupled where they meet.

The end of the pipe A next to the coupling-pipes is closed, and provided with an enlargement, through which the diminished end of a short pipe, F, passes.

The pipe F has an enlarged end, and through this enlargement the diminished end of a short pipe, B, passes.

The two pipes B both have enlarged ends, and to one of them is attached a flaring-mouthed tube or pipe, large enough to receive snugly the pipe or tube upon the other. In use, these tubes move endwise, one working in the other, so as to accommodate the couplings to the closing up or separating of the cars.

Stop-cocks E E are used in the main pipes, for cutting off the air when necessary to add on or take off a car. These several pipes have closely-packed joints, but fit into each other in such manner that a universal-joint coupling is formed.

No rubber or leather or canvas pipes are required, as all of the connections are of metal.

Having thus fully described my invention, what I claim as new, and desire to secure by Letters Patent, is—

In combination with the two main pipes A A of adjacent cars, the pipes F F, provided with enlarged ends, and the pipes B B, similarly constructed, the pipe C, and the bell-mouthed pipe D, all constructed and used substantially as set forth.

In testimony that I claim the foregoing as my own I affix my signature in presence of two witnesses.

FREDERICK A. SHEELEY.

Witnesses:
HESLIP PHILLIPS,
A. J. DE HASS.